United States Patent
Garson et al.

(10) Patent No.: US 8,200,895 B2
(45) Date of Patent: Jun. 12, 2012

(54) FILE SYSTEM RECOGNITION STRUCTURE

(75) Inventors: Matthew S. Garson, Seattle, WA (US); Ravinder S. Thind, Sammamish, WA (US); Darwin Ou-Yang, Redmond, WA (US); Karan Mehra, Sammamish, WA (US); Neal R. Christiansen, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 503 days.

(21) Appl. No.: 12/435,239

(22) Filed: May 4, 2009

(65) Prior Publication Data

US 2010/0281299 A1 Nov. 4, 2010

(51) Int. Cl.
*G06F 13/00* (2006.01)
*G06F 11/00* (2006.01)

(52) U.S. Cl. .................. 711/112; 711/E12.008; 714/15; 714/42; 714/E11.02; 714/E11.117; 707/E17.01

(58) Field of Classification Search .................. 711/112, 711/E12.008; 714/15, 42, E11.02, E11.117; 707/E17.01
See application file for complete search history.

(56) References Cited

U.S. PATENT DOCUMENTS

| | | | | |
|---|---|---|---|---|
| 5,363,487 A * | 11/1994 | Willman et al. | .................. | 710/8 |
| 5,537,592 A | 7/1996 | King et al. | | |
| 6,044,436 A | 3/2000 | Otsuka | | |
| 6,119,118 A * | 9/2000 | Kain et al. | ..................... | 707/822 |
| 6,895,413 B2 | 5/2005 | Edwards | | |
| 7,330,417 B2 | 2/2008 | Billau et al. | | |
| 2002/0091710 A1 * | 7/2002 | Dunham et al. | .............. | 707/200 |
| 2003/0009473 A1 * | 1/2003 | Ham et al. | ...................... | 707/102 |
| 2003/0084262 A1 * | 5/2003 | Weirauch | ...................... | 711/170 |
| 2004/0133570 A1 * | 7/2004 | Soltis | ................................ | 707/3 |
| 2005/0216788 A1 * | 9/2005 | Mani-Meitav et al. | ........... | 714/6 |
| 2007/0266037 A1 * | 11/2007 | Terry et al. | ..................... | 707/100 |
| 2010/0070747 A1 * | 3/2010 | Iyigun et al. | ..................... | 713/2 |

OTHER PUBLICATIONS

Brzitwa, Michail, "gpart—Guess PC-type hard disk partitions," Mar. 2000, from http://www.brzitwa.de/mb/gpart/.*
Brzitwa, Michail, "gpart Manual" Jan. 2001, from http://www.linux-tutorial.info/modules.php?name=ManPage&sec=8&manpage=gpart.*
Microsoft Corporation, Obtaining File System Recognition Information (2-page web brochure), http://msdn.microsoft.com/en-us/library/dd442656(VS.85,printer).aspx, Copyright 2009 by Microsoft Corporation.
Microsoft Corporation, File System Recognition Components and Use (1-page web brochure), http://msdn.microsoft.com/en-us/library/dd442652(VS.85,printer).aspx, Copyright 2009 by Microsoft Corporation.
Samba, Ph.D., Augustine, instructor, Kent State University, course study, Chapter 9: File System Interface, http://www.cs.kent.edu/asamba/cs33211/file_system_intf.pdf.

* cited by examiner

Primary Examiner — J. H. Hur

(57) ABSTRACT

Embodiments include a file system data structure and file system recognition APIs that may allow an operating system to identify a partition of a storage device as having a valid file system, even if the operating system does not know how to access the file system a priori. File systems can implement these data structures in a standardized, known location within a partition on the storage device such that an operating system may use APIs or other functions to examine the known location for the presence of these data structures. Information on how to interpret the data structure may be obtained using a network or other source.

20 Claims, 5 Drawing Sheets

FILE SYSTEM RECOGNITION STRUCTURE

BACKGROUND

This Background is intended to provide the basic context of this patent application and it is not intended to describe a specific problem to be solved.

For data on a given storage device, such as a hard disk or a flash device, to be accessible on a computing device, the operating system on the computing device needs to be able to recognize and understand the one or more file systems used on the storage device. To recognize a file system, the operating system examines the file system data structures on the storage device for specific, identifying characteristics and then compares the characteristics of the file system data structures on the storage device against the characteristics of a list of known file systems that can be accessed by the operating system. If the characteristics of the file system data structures are consistent with those from one of the known file systems, then the operating system can access the data on that partition of the disk. If the structure is not known, the operating system assumes that that partition of the storage device is empty and needs to be formatted, even if there is data there that is in a format that is not understood.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A set of file system data structure and file system recognition APIs are disclosed that may allow an operating system to identify partitions of a storage device as having a valid file system, even if the operating system does not know how to access the file system. File systems implement these data structures in a standardized, known location within a partition on the storage device such that an operating system may use APIs or other functions to examine that known location for the presence of these data structures. If the data structures exist on the storage device, then the operating system can coordinate that there is a valid file system on that partition of the storage device, even if the operating system does not have a priori knowledge of how to interpret the specific data structures associated with that file system. Information on how to interpret the data structure may be obtained using a network or other source. Thus, the operating system may now distinguish between partitions of the storage devices that have a valid, but unrecognizable file system and partitions of the storage device that do not contain a file system. As a result, the operating system can disambiguate such that it will not attempt to format a partition of a disk that may contain valid data, reducing the likelihood of data loss.

SPECIFICATION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
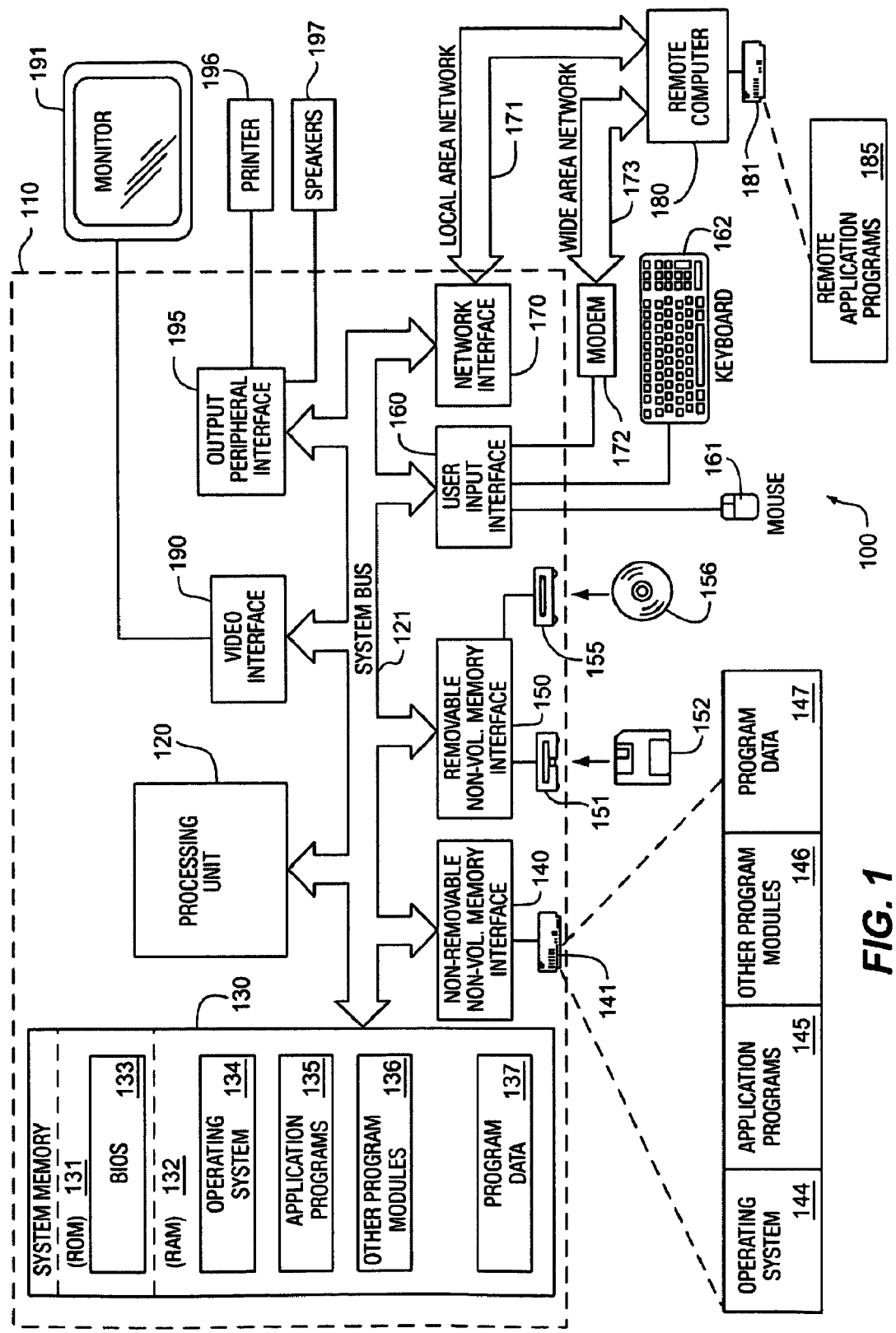
FIG. 1 is an illustration of a computing device.

FIG. 1 illustrates an example of a suitable computing system environment 100 that may operate to execute the many embodiments of a method and system described by this specification. It should be noted that the computing system environment 100 is only one example of a suitable computing environment and is not intended to suggest any limitation as to the scope of use or functionality of the method and apparatus of the claims. Neither should the computing environment 100 be interpreted as having any dependency or requirement relating to any one component or combination of components illustrated in the exemplary operating environment 100.

With reference to FIG. 1, an exemplary system for implementing the blocks of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120.

The computer 110 may operate in a networked environment using logical connections to one or more remote computers, such as a remote computer 180, via a local area network (LAN) 171 and/or a wide area network (WAN) 173 via a modem 172 or other network interface 170.

Computer 110 typically includes a variety of computer readable media that may be any available media that may be accessed by computer 110 and includes both volatile and nonvolatile media, removable and non-removable media. The system memory 130 includes computer storage media in the form of volatile and/or nonvolatile memory such as read only memory (ROM) 131 and random access memory (RAM) 132. The ROM may include a basic input/output system 133 (BIOS). RAM 132 typically contains data and/or program modules that include operating system 134, application programs 135, other program modules 136, and program data 137. The computer 110 may also include other removable/non-removable, volatile/nonvolatile computer storage media such as a hard disk drive 141 a magnetic disk drive 151 that reads from or writes to a magnetic disk 152, and an optical disk drive 155 that reads from or writes to an optical disk 156. The hard disk drive 141, 151, and 155 may interface with system bus 121 via interfaces 140, 150.

A user may enter commands and information into the computer 110 through input devices such as a keyboard 162 and pointing device 161, commonly referred to as a mouse, trackball or touch pad. Other input devices (not illustrated) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device may also be connected to the system bus 121 via an interface, such as a video interface 190. In addition to the monitor, computers may also include other peripheral output devices such as speakers 197 and printer 196, which may be connected through an output peripheral interface 190.

Figure 2:
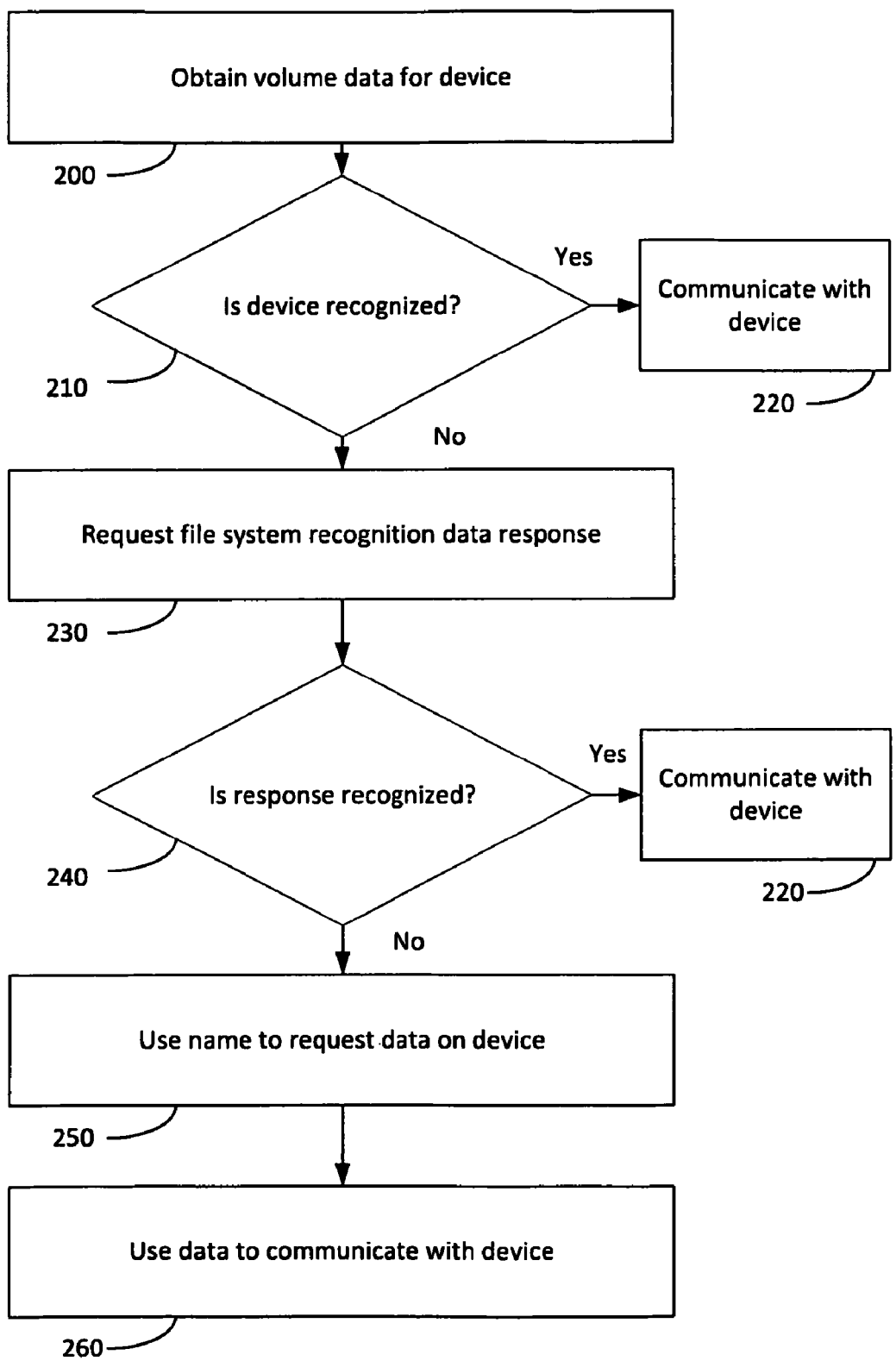
FIG. 2 is an illustration of a method of analyzing an electronic data storage device in communication with computing device.

FIG. 2 illustrates an embodiment of a method of analyzing an electronic data storage device in communication with computing device. The electronic data storage device may be any device that stores electronic data such as a hard drive (internal, external, local or remote), a flash memory device, a hybrid drive, cd, dvd, etc. Similarly, the computing device may be any device that uses a processor, from a cell phone to a desktop computing device.

In the past, when a new electronic data storage device is connected to a computing device, the computing device would make an inquiry of or read certain known blocks from the electronic data storage device to see if the file systems used on the partitions of the device are recognized. If a file system was recognized, the file system would mount the partition and expose a file system layout to the user. If a file system was not recognized, then the user was presented the option to format the partition, erasing any existing data on that partition, even if there was data on that partition that simply was in a format that was not recognized. The proposed method attempts to address this problem by adding an additional manner for the file system used on a partition of the electronic data storage device to be recognized. In short, a static data structure is added to the boot sector of the partition. Usually, the structure will contain the name of the file system used to format the partition or the layout of data on the partition may be determined from other information in the structure. The name, layout of the data on the partition or other file information may be used to access the data on the partition. The existence of this structure implies that there is valid data on that partition of the storage device even if the operating system does not recognize it; therefore, the user will not be prompted to format the partition. Additional methods may be employed to locate software that will allow access to the data on that partition of the storage device. This may include but is not limited to prompting the user with the name provided in the structure, searching other storage devices attached to the system for appropriate software which supports access to the data or searching the internet for this software. If the file system is not recognized or the structure does not exist or the file structure is not understood, in some embodiments, the name may be researched to see if relevant information may be obtained such that the drive may be used. If the additional information is not available or the file system characteristics are not known from the structure, then the file system is assumed to be unknown and then an offer may be made to format that partition of the storage device.

Figure 4:
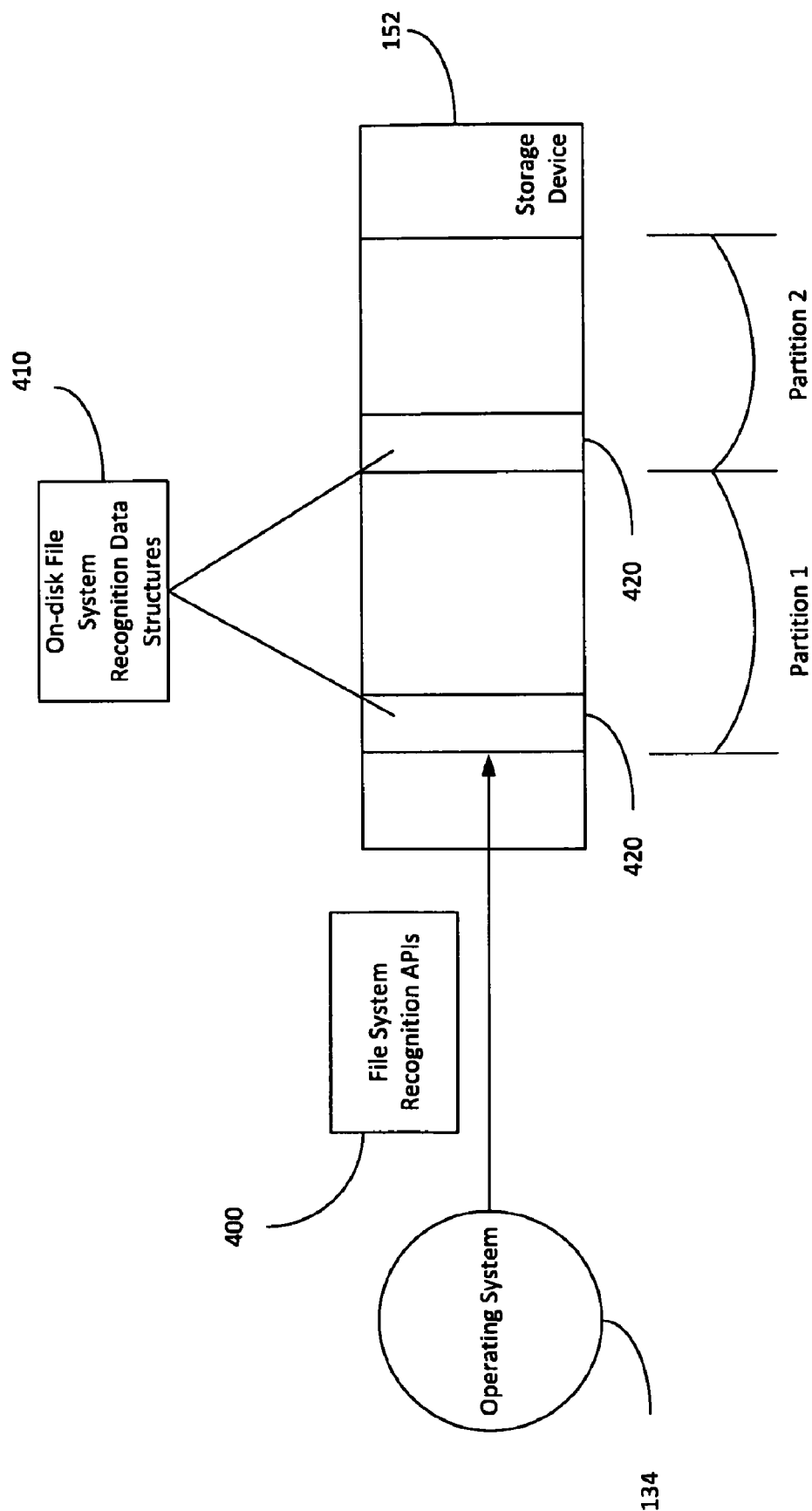
FIG. 4 is an illustration of hardware and software interaction in executing the method.

FIG. 4 may illustrate where the various pieces of the hardware or software may exist. The operating system 134 is assumed to be known. The file system recognition APIs 400 may operate between the operating system 134 and a storage device 152. The on-disk file system recognition data structures 410 may be stored in the boot sector 420 on the electronic storage device 152.

At block 200, volume data for a partition of the electronic storage device may be obtained from the electronic storage device 152. The volume data may be obtained by issuing a query or by receiving a response. At block 210, it may be determined whether the volume data results in the file system being recognized. By analyzing the volume data, the drive may be immediately recognized based on the response. If the file system on that partition of the electronic storage device 152 is immediately recognized, at block 220, structured communication may begin with that partition of the electronic data storage device 152.

At block 230, if the file system is not recognized at block 220, a response may be requested for file system recognition data 410 from the electronic data storage device 152. In one embodiment, the file system recognition data 410 is stored at a known location 420 within the partitions on the storage device 152, such as at a boot sector/logical sector 0.

Figure 5:
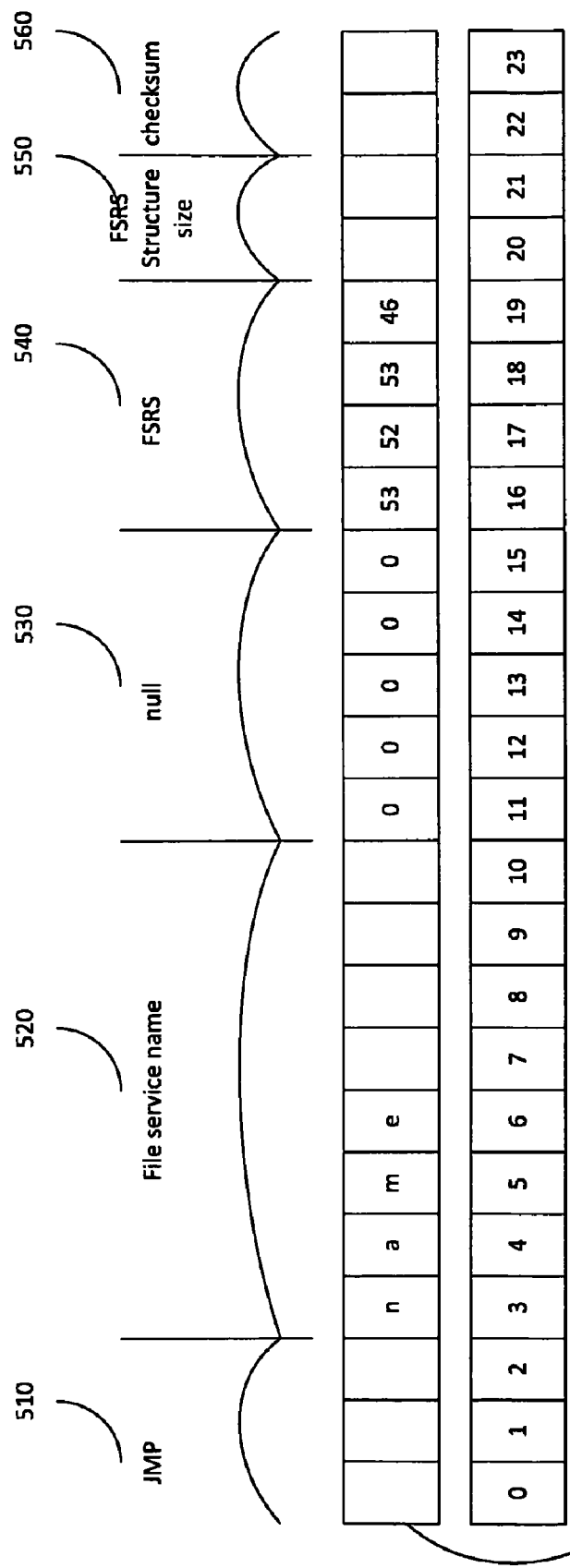
FIG. 5 is an illustration of a sample file system data structure.

The file system recognition data 410 may be stored in a form of a data structure. The data structure may comprise a plurality of bytes. FIG. 5 may be an illustration of a sample data structure 500. The first three bytes of the data structure 500 may be a Jmp instruction 510. A Jmp instruction 510 may literally tell an operating system or other controlling system where to look for the rest of the boot up code.

A next 8 bytes of the data structure 500 may be a human understandable file system name 520. The file system name 520 may be used to obtain information on how to interpret the file system. Note this string is in the same place as the traditional OEM file system name on a disk with a normal bios parameter block (BPB) structure.

The file system name 520 may be communicated to a second source to obtain the necessary file system interpretation information. As the secondary source may review the file system name 520, the file system name 520 may be understood by someone reviewing the communications. In addition, the file system name 520 may be unique to the file system in question.

A next five bytes 530 of the data structure 500 may be 0. In some file systems, these bytes represent a BPB. These bytes normally hold the bytes per sector, the sectors per cluster and the reserved sector count. By marking these as 0, down level operating systems should recognize that additional information about the file system is needed. In addition, the disk information will not be misrecognized.

An additional four bytes 540 in the data structure 500 may be a string to identify the file system as a file system recognition structure (FSRS) file system or a system that uses the file system recognition structure. In one embodiment, the four bytes 540 may be 0x53525346 which may identify the file structure as ('F', 'S', 'R', 'S').

An additional two bytes 550 in the data structure 500 may indicate a number of bytes in the file system recognition structure, from the beginning to the end, including the Jmp 510.

An additional two bytes in the data structure 500 may be an FSRS checksum 560. The checksum 560 may be a two byte checksum calculated over the bytes starting at FsName and ending at the last byte of the data structure, skipping the Jmp 510 and Checksum 560 fields.

A sample data structure declaration may be as follows:

```
#define FSRS_IDENTIFIER 0x5352546
typedef struct_FILE_SYSTEM_RECOGNITION_STRUCTURE {
//
// 3 bytes: JMP instruction
//
// Note that JMP instruction is *not* included in the checksum.
//
UCHAR Jmp[3];
//
// 8 bytes: FSRS File System Name.
//
// 8 ASCII charactaers indicating non-localizable human readable name
// of the filesystem this volume is formatted with.
//
// Note this string is in the same place as the OEM filesystem name
// on a disk with a normal BPB structure.
//
UCHAR FsName[8];
//
// 5 bytes MustBeZero
//
// Note these fields overlap what normally are these fields in a BPB:
//
// BytesPerSector
// SectorPerCluster
// ReservedSectorCount
//
// Since they are zeroed. This should be sufficient to cause down-level
// OSes to conclude this is not a valid BPB, and therefore not
mis-recognize the volume.
//
UCHAR MustBeZero[5];
//
// At this point in the structure, we are aligned to 16 bytes.
//
//
// 4 bytes: FSRS Identifier
//
// Indicates these bytes contain an FSRS.
//
// Use the following number: 0x53525346 ('F', 'S', 'R', 'S')
//
ULONG Identifier;
//
// 2 bytes: FSRS Structure Size
//
// The number of bytes in the FSRS, from the beginning to the
// end (including the Jmp).
//
USHORT Length;
//
// 2 bytes: FSRS Checksum
//
// A two byte checksum calculated over the bytes starting at FsName and
// ending at the last bytes of this struct, skipping the Jmp and Checksum
// fields.
//
USHORT Checksum;
//
// Future fields can be added at the end as long as the length field
// is adjusted.
//
} FILE_SYSTEM_RECOGNITION_STRUCTURE;
```

An application programming interface (API) may be used to request the file system recognition structure 500. The existing file systems may not have the ability to recognize partitions of storage media that contain a valid file system that has not been defined yet, but the media may be able to identify itself through the presence of a file system recognition structure as described previously. As existing file systems may not recognize a new file system, RAW may mount the partition and provide direct block level access. Rather than offer to format the partition (an erase all the data), the RAW file system may have the ability to recognize the file structure and provide applications access to such structures through a file system control request, such as FSCTL_QUERY_FILE_SYSTEM_RECOGNITION. The following data structure may be returned to the application in response to the request:

```
//
// Structure for FSCTL_QUERY_FILE_SYSTEM_RECOGNITION
//
typedef struct_FILE_SYSYTEM_RECOGNITION_INFORMATION{
    CHAR FileSystem[9];
} FILE_SYSTEM_RECOGNITION_INFORMATION,
*PFILE_SYSTEM_RECOGNITION_INFORMATION;
```

A checksum may operate on the response. The checksum may take on a variety of forms. In one embodiment, the checksum is created as follows:

A valid checksum may be determined as follows:

```
USHORT
ComputeFileSystemInformationChecksum (
    _in PFILE_SYSTEM_RECOGNITION_STRUCTURE Fsrs
    )
/*++
compute the checksum for the file record
Fsrs - pointer to the record
Return value - checksum result
--*/
{
    USHORT Checksum = 0;
    USHORT I;
    PUCHAR Buffer = (PUCHAR) Fsrs;
    USHORT StartOffset;
    //
    //  Skip the jump instruction
    //
    StartOffset =
    FIELD_OFFSET(FILE_SYSTEM_RECOGNITION_STRUCTURE,
    FsName);
For (i=StartOffset; i< Fsrs ->Length; i++){
    //
    //  Skip the checksum field itself, which is a USHORT.
    //
    if ((I == FIELD_OFFSET(FILE_SYSTEM_RECOG-
    NITION_STRUCTURE, Checksum)) ||
    (I == FIELD_OFFSET(FILE_SYSTEM_RECOG-
NITION_STRUCTURE, Checksum)+1)) {
    continue;
    }
    Checksum = ((Checksum & 1) ? 0x8000 : 0) +
    (Checksum >> 1) + Buffer[i];
}
return Checksum;
}
```

At block 240, if the response is not received or is not understood, an offer may be made to format that partition of the electronic storage device. If the response is not received, that partition of the electronic storage device 152 likely does not have a file system recognition structure of a similar system and may really be unformatted, new, corrupted, etc.

At block 250, if the response is understood, information may be obtained related to the response to access data on that partition of the electronic data storage device 152. The information may be obtained in a variety of ways. In one embodiment, the response is used to link to a known network location and requesting additional information (a driver) related to the response. The network link may be over the internet or any other appropriate network.

At block 260, once the data is received about the partition of the electronic storage device 152, communication may begin with that partition of the electronic storage device 152. In some embodiments, if the response appears corrupted, a disk analysis program on that partition of the electronic storage device 152 may be offered.

Figure 3:
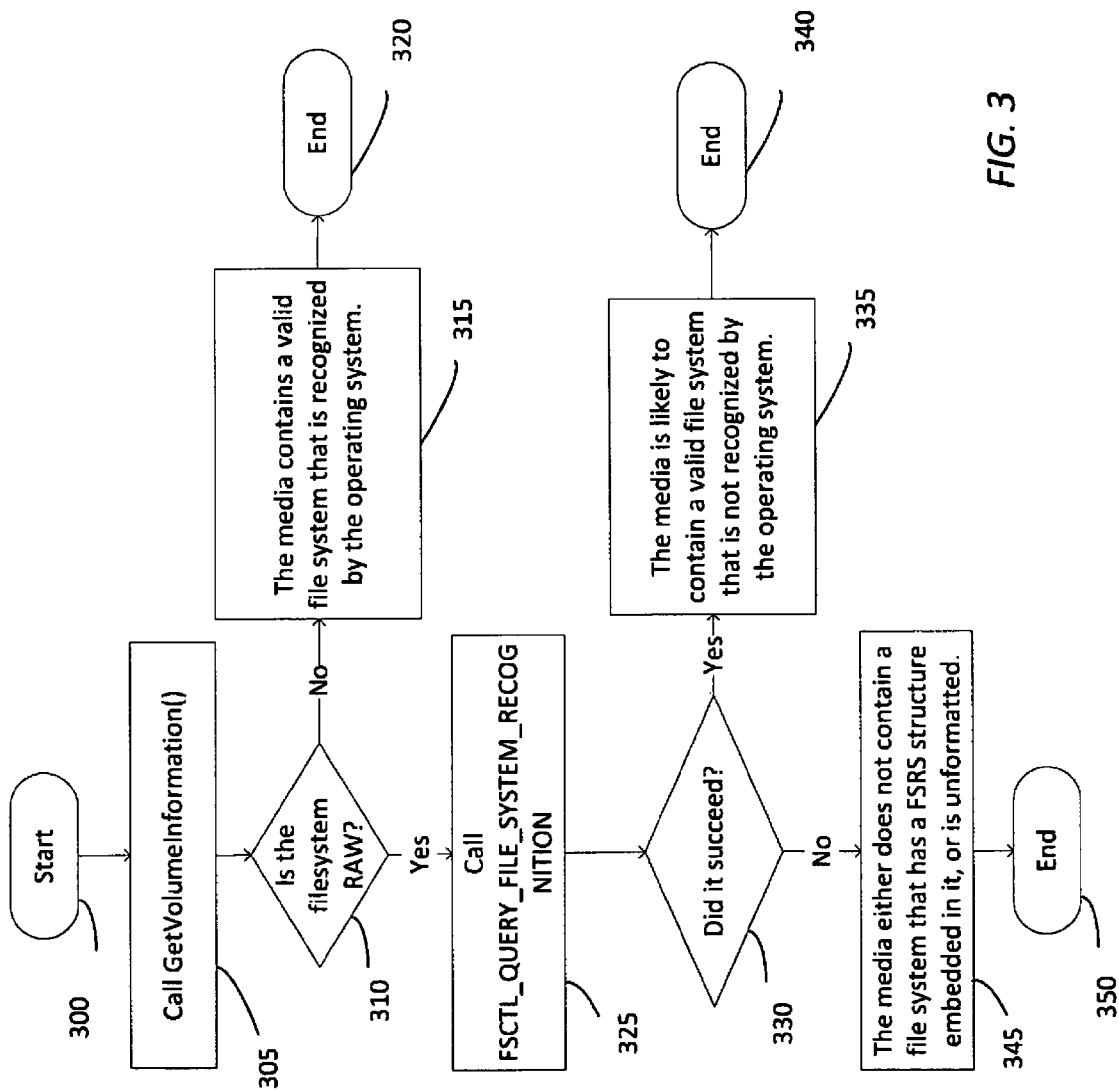
FIG. 3 is an illustration of a more specific method of analyzing an electronic data storage device in communication with computing device.

FIG. 3 illustrates another, more specific illustration of an example of a method of using a file system recognition structure 500. This example may begin at block 300. At block 305, a function, such as an API, may be called to obtain information about the partition of the electronic storage device 152. At block 310, the response may be reviewed to see if it is a RAW file-system. If it is not RAW, then, at block 315, the file system likely contains a valid file system that is recognized by the operating system. At block 320, the method may end.

If, at block 310, the filesystem was RAW, then at block 325, a function may be called to query to file system recognition information such as FSCTL_QUERY_FILE_SYSTEM_RECOGNITION. At block 330, it may be determined if the method was successful or if a useful response was received. If a useful response was received, at block 335, the response may be used to find additional information about the file system and at block 340, the method may end.

If, at block 330 the function did not succeed, then at block 345, it may be determined that the partition does not contain a file system that has the file system recognition structure 500 on it or it is unformatted. At block 350, the method may end.

In conclusion, the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

The invention claimed is:

1. A method comprising:
    determining that a file system on a partition of an electronic storage device is not recognized;
    requesting, responsive to said determining, a response from a file system recognition structure included as part of the partition on the electronic data storage device, the file system recognition structure including at least a name for the file system;
    if the response is not received or is not understood, indicating that the response was not understood; and
    if the response is understood, using at least the name for the file system to obtain interpretation information for the file system and to access data on the partition on the electronic data storage device.

2. The method of claim 1, wherein said using comprises automatically linking to a network location and requesting the interpretation information.

3. The method of claim 1, further comprising if the response is not received or not understood, providing an option to format the partition on the electronic storage device.

4. The method of claim 1, further comprising if the response appears corrupted, providing an option to run a disk analysis program on the electronic storage device.

5. The method of claim 1, further comprising executing a checksum application on the response.

6. The method of claim 1, further comprising obtaining file system data by looking for the file system recognition structure at a known static location within the partition on the electronic storage device.

7. The method of claim 6, further comprising looking for the file system recognition structure at a boot sector/logical sector 0.

8. The method of claim 7, wherein the file system recognition structure is stored in a data structure.

9. The method of claim 8, wherein a first three bytes of the data structure include a Jmp instruction; a next 8 bytes of the data structure are a human understandable file system name; and a next five bytes of the data structure are 0.

10. The method of claim 9, wherein an additional four bytes in the data structure comprise a number 0x53525346 that identifies the file system as a file system recognition structure compatible file system.

11. The method of claim 10, wherein an additional two bytes in the data structure comprise a number of bytes in the file system service recognition structure, from a beginning of the data structure to an end of the data structure, including a Jmp field.

12. The method of claim 11, wherein a second additional two bytes in the data structure comprises a checksum, and wherein the checksum comprises two bytes calculated starting at FsName and ending at a last byte of the data structure, skipping the Jmp field and the checksum.

13. A computer storage medium comprising computer executable instructions for analyzing an electronic data storage device, the instructions comprising instructions for:
    determining that a file system on a partition on the electronic storage device is not recognized;
    requesting, responsive to said determining, a response from a file system recognition structure from the partition on the electronic data storage device, the file system recognition structure including at least an identifier that identifies the file system and an instruction that, when invoked, indicates a location for boot code for the electronic storage device;
    if the response is not received or is not understood, indicating that the response was not understood and providing an option to format the partition on the electronic storage device;
    if the response appears corrupted, providing an option to run a disk analysis program on the electronic storage device; and
    if the response is understood:
        obtaining, using the identifier, interpretation information that enables data on the partition on the electronic data storage device to be accessed; and
        invoking the instruction to access the boot code for the electronic storage device.

14. The computer storage medium of claim 13, wherein said obtaining comprises linking to a network location and requesting the interpretation information.

15. The computer storage medium claim 13, further comprising executing a checksum application on the response.

16. The computer storage medium of claim 13, further comprising obtaining file system data by looking for the file system recognition structure at a known static location within the partition on the electronic storage device.

17. The computer storage medium of claim 13, wherein the file system recognition structure is stored in a data structure and wherein the data structure comprises:
    a first three bytes which include the instruction that, when invoked, indicates a location for boot code for the electronic storage device;

a next 8 bytes that include a human understandable file system name;

a next five bytes that are 0;

an additional four bytes which include a number 0x53525346 that identifies the file system as a file system recognition structure compatible file system;

an additional two bytes that comprise a number of bytes in the file system recognition structure, from a beginning to an end, including a Jmp field;

a second additional two bytes that comprise a checksum, wherein the checksum comprises two bytes calculated starting at FsName and ending at a last byte of the data structure, skipping the Jmp field and the checksum.

18. A system comprising computer executable instructions for:

determining that a file system on a partition on an electronic storage device is not recognized;

ascertaining that the file system is a file system recognition structure file system;

accessing, responsive to said ascertaining, a file system recognition structure to determine an identifier for the file system; and obtaining, using the identifier, information that enables data on the partition on the electronic data storage device to be accessed, wherein said obtaining comprises automatically communicating the identifier for receipt by a network location and requesting the information.

19. The system of claim 18, wherein said accessing comprises accessing the file system recognition structure at a known static location within the partition on the electronic storage device.

20. The system of claim 18, wherein the file system recognition structure is stored in a data structure and wherein the data structure comprises:

a first three bytes which include a Jmp instruction;

a next 8 bytes which include a human understandable file system name;

a next five bytes which are 0;

an additional four bytes which include a number 0x53525346 that identifies the file system as a file system recognition structure compatible file system;

an additional two bytes which comprise a number of bytes in the file system recognition structure, from a beginning to an end, including a Jmp field;

a second additional two bytes which comprise a checksum; wherein the checksum comprises two bytes calculated starting at FsName and ending at a last byte of the data structure, skipping the Jmp field and the checksum.

\* \* \* \* \*